(12) United States Patent
Kim et al.

(10) Patent No.: US 12,528,931 B2
(45) Date of Patent: Jan. 20, 2026

(54) DIHEXYL BENZENE DICARBOXYLATE-BASED PLASTICIZER COMPOSITION AND RESIN COMPOSITION COMPRISING THE SAME

(71) Applicant: LG CHEM, LTD., Seoul (KR)

(72) Inventors: Hyun Kyu Kim, Daejeon (KR); Joo Ho Kim, Daejeon (KR); Woo Hyuk Choi, Daejeon (KR); Jeong Ju Moon, Daejeon (KR); Seok Ho Jeong, Daejeon (KR)

(73) Assignee: LG CHEM, LTD., Seoul (KR)

(*) Notice: Subject to any disclaimer, the term of this patent is extended or adjusted under 35 U.S.C. 154(b) by 461 days.

(21) Appl. No.: 18/023,260

(22) PCT Filed: Nov. 23, 2021

(86) PCT No.: PCT/KR2021/017321
§ 371 (c)(1),
(2) Date: Feb. 24, 2023

(87) PCT Pub. No.: WO2022/114743
PCT Pub. Date: Jun. 2, 2022

(65) Prior Publication Data
US 2023/0340228 A1   Oct. 26, 2023

(30) Foreign Application Priority Data
Nov. 24, 2020  (KR) .................. 10-2020-0158964

(51) Int. Cl.
*C08K 5/12*    (2006.01)
*C08K 5/00*    (2006.01)
*C08K 5/05*    (2006.01)

(52) U.S. Cl.
CPC ............. *C08K 5/12* (2013.01); *C08K 5/0016* (2013.01); *C08K 5/05* (2013.01)

(58) Field of Classification Search
CPC .................................... C08K 5/12; C08K 5/05
See application file for complete search history.

(56) References Cited

U.S. PATENT DOCUMENTS

| | | |
|---|---|---|
| 4,929,749 A | 5/1990 | Gupta et al. |
| 5,462,986 A | 10/1995 | Bahrmann et al. |
| 5,463,147 A | 10/1995 | Bahrmann et al. |
| 2004/0238787 A1 | 12/2004 | Wiese et al. |
| 2005/0106405 A1 | 5/2005 | Breitscheidel et al. |
| 2010/0305255 A1 | 12/2010 | Grass |
| 2011/0281987 A1* | 11/2011 | Godwin .............. C08K 5/0016 524/291 |
| 2016/0237244 A1 | 8/2016 | Boeck et al. |
| 2016/0264509 A1 | 9/2016 | Kaller et al. |
| 2016/0272780 A1 | 9/2016 | Kim et al. |
| 2016/0280629 A1 | 9/2016 | Jung et al. |
| 2016/0376219 A1 | 12/2016 | Kim et al. |
| 2017/0081501 A1 | 3/2017 | Kim et al. |
| 2017/0166724 A1 | 6/2017 | Kim et al. |
| 2018/0022893 A1 | 1/2018 | Kim et al. |
| 2018/0265672 A1 | 9/2018 | Kim et al. |
| 2019/0047938 A1 | 2/2019 | Kim et al. |
| 2019/0048167 A1 | 2/2019 | Kim et al. |
| 2021/0363324 A1 | 11/2021 | Kim et al. |
| 2022/0162421 A1* | 5/2022 | Kim ....................... C08L 27/06 |
| 2022/0185988 A1 | 6/2022 | Kim et al. |
| 2022/0251336 A1 | 8/2022 | Kim et al. |
| 2022/0325070 A1 | 10/2022 | Kim et al. |

FOREIGN PATENT DOCUMENTS

| | | |
|---|---|---|
| CN | 105683147 A | 6/2016 |
| CN | 105885086 A | 8/2016 |
| CN | 107207774 A | 9/2017 |
| CN | 108699286 A | 10/2018 |
| EP | 0388197 A1 | 9/1990 |
| JP | H03-056446 A | 3/1991 |
| JP | 2005-504118 A | 2/2005 |
| JP | 2011-510937 A | 4/2011 |
| JP | 2016-150940 A | 8/2016 |
| JP | 2017-506216 A | 3/2017 |
| JP | 2017-509592 A | 4/2017 |
| KR | 10-1995-0008456 A | 4/1995 |
| KR | 10-2015-0072197 A | 6/2015 |
| KR | 10-2015-0093608 A | 8/2015 |
| KR | 10-2016-0079065 A | 7/2016 |
| KR | 10-2016-0101880 A | 8/2016 |
| KR | 10-2019-0024935 A | 3/2019 |

(Continued)

OTHER PUBLICATIONS

Office Action issued Nov. 29, 2023 for Chinese Patent Application No. 202180051200.8 (Note: KR 2020-0127890 A was cited in a prior IDS.).
International Search Report (with partial translation) and Written Opinion dated Mar. 2, 2022, for corresponding International Patent Application No. PCT/KR2021/017321.
Office Action issued in JP application 2023-518012 dated Apr. 1, 2024.
Extended European Search Report issued in application 21898569.5 dated Apr. 22, 2024 (Note: US 2018/0022893 A1 was previously cited).
Office Action dated Nov. 11, 2024 issued in corresponding Taiwanese patent application 11321156370.

*Primary Examiner* — Yate' K Cutliff

(74) *Attorney, Agent, or Firm* — Morgan, Lewis & Bockius LLP

(57) ABSTRACT

The present invention is characterized in including a dihexyl benzene dicarboxylate having an alkyl group derived from an isomer mixture of hexyl alcohol, in the case of applying to a resin, stress resistance and mechanical properties may be maintained to the same or higher levels, and plasticization efficiency may be markedly improved while maintaining the balance among tensile strength, elongation rate and migration resistance.

11 Claims, No Drawings

(56) References Cited

FOREIGN PATENT DOCUMENTS

| | | |
|---|---|---|
| KR | 10-2108875 B1 | 5/2020 |
| KR | 10-2020-0127890 A | 11/2020 |
| WO | 2020/045901 A1 | 5/2020 |
| WO | 2020/222500 A1 | 5/2020 |

* cited by examiner

DIHEXYL BENZENE DICARBOXYLATE-BASED PLASTICIZER COMPOSITION AND RESIN COMPOSITION COMPRISING THE SAME

TECHNICAL FIELD

Cross-Reference to Related Applications

The present application claims the benefit of priority based on Korean Patent Application No. 10-2020-0158964, filed on Nov. 24, 2020, the entire contents of which are incorporated herein by reference.

Technical Field

The present invention relates to a plasticizer composition including dihexyl benzene dicarboxylates derived from a mixture alcohol of hexyl alcohol isomers, and a resin composition comprising the same.

BACKGROUND ART

Generally, plasticizers are obtained through the reaction of alcohols with polycarboxylic acids such as phthalic acid and adipic acid to form corresponding esters. In addition, considering the internal and external regulations on harmful phthalate-based plasticizers to the human body, studies are being continued on plasticizer compositions which may replace phthalate-based plasticizers such as terephthalate-based, adipate-based and other polymer-based plasticizers.

Meanwhile, regardless of the type of industry including plastisol type of industry of flooring materials, wallpaper, soft and hard sheets, etc., calendaring type of industry, or extrusion/injection compound type of industry, the demand for eco-friendly products is increasing. In order to reinforce the quality properties, processability and productivity according to the finished products, an appropriate plasticizer is required considering discoloration, migration, mechanical properties, etc.

According to the properties required by the types of industry in various areas of usage, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in case of applying di(2-ethylhexyl) terephthalate (DEHTP) which is relatively cheap and widely used among plasticizer compositions which may be applied to PVC, hardness or sol viscosity is high, absorption rate of a plasticizer is relatively slow, and migration and stress migration are not good.

As improvements on the above limitations, the application of a transesterification product with butanol as a plasticizer, may be considered as a composition including DEHTP. However, in this case, plasticization efficiency is improved, but volatile loss or thermal stability is inferior and mechanical properties are somewhat degraded, and the improvement of physical properties is required, and accordingly, there is no solution but employing a method compensating the defects through mixing with a second plasticizer at the present time.

However, in case of applying the second plasticizer, there are drawbacks of generating unexpected defects as follows: the change of the physical properties is hard to predict, the application may become a factor of increasing the unit cost of the product, the improvement of the physical properties is not clearly shown except for specific cases, and problems relating to compatibility with a resin may arise.

In addition, if a material like tri (2-ethylhexyl) trimellitate or triisononyl trimellitate is applied as a trimellitate-based product in order to improve the inferior migration, loss properties and light resistance of the DEHTP products, migration or loss properties may be improved, but plasticization efficiency may be degraded, and a great deal of the material is required to be injected to provide a resin with suitable plasticization effects, and considering the relatively high unit price of the products, commercialization thereof is impossible.

Also, if a material such as dibutyl terephthalate is mixed as a terephthalate series product, there are problems in that environmental issues may arise including air pollution during processing due to inferior volatile loss, and the use in a greater amount than a certain amount is limited, and the improvement of plasticization efficiency is impossible.

Accordingly, the development of products for solving the environmental issues of the conventional phthalate-based products or products for improving inferior physical properties of the eco-friendly products for improving the environmental issues of the phthalate-based products is required.

DISCLOSURE OF THE INVENTION

Technical Problem

The present invention provides a plasticizer composition characterized in including dihexyl benzene dicarboxylates having an alkyl group derived from an isomer mixture of hexyl alcohol, and if applied to a resin, plasticization efficiency may be markedly improved while maintaining balance among tensile strength, elongation rate and migration resistance.

Technical Solution

To solve the tasks, the present invention provides a plasticizer composition.

(1) The present invention provides a plasticizer composition comprising one or more dihexyl benzene dicarboxylates, wherein the dihexyl benzene dicarboxylate is one or more selected from dihexyl isophthalate and dihexyl terephthalate, a hexyl group of the dihexyl benzene dicarboxylate is derived from an isomer mixture of hexyl alcohol, and the isomer mixture of hexyl alcohol comprises two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol.

(2) The present invention provides the plasticizer composition of (1) above, wherein the isomer mixture of hexyl alcohol comprises 1-hexanol and 2-methylpentanol.

(3) The present invention provides the plasticizer composition of (1) or (2) above, wherein the isomer mixture of hexyl alcohol comprises 30 parts by weight or more of a branch type alcohol based on 100 parts by weight of the isomer mixture.

(4) The present invention provides the plasticizer composition of any one of (1) to (3) above, wherein the isomer mixture of hexyl alcohol comprises 40 to 95 parts by weight of a branch type alcohol based on 100 parts by weight of the isomer mixture.

(5) The present invention provides the plasticizer composition of any one of (1) to (4) above, wherein the isomer mixture of hexyl alcohol comprises 40 parts by weight or less of 1-hexanol based on 100 parts by weight of the isomer mixture.

(6) The present invention provides the plasticizer composition of any one of (1) to (5) above, wherein the dihexyl benzene dicarboxylate is dihexyl isophthalate.

(7) The present: invention provides the plasticizer composition of any one of (1) to (6) above, wherein the dihexyl benzene dicarboxylate is dihexyl terephthalate.

(8) The present invention provides the plasticizer composition of any one of (1) to (7) above, wherein the dihexyl benzene dicarboxylate is a mixture of dihexyl isophthalate and dihexyl terephthalate.

(9) The present invention provides the plasticizer composition of any one of (1) to (8) above, wherein the isomer mixture of hexyl alcohol comprises 1-hexanol, 2-methylpentanol and 3-methylpentanol.

(10) The present invention provides a resin composition comprising 100 parts by weight of a resin and 5 to 150 parts by weight of the plasticizer composition according to any one of (1) to (9) above.

(11) The present invention provides the resin composition of (10) above, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, polylactic acid, natural rubber, and synthetic rubber.

Advantageous Effects

The plasticizer composition according to an embodiment of the present invention, if used in a resin composition, may markedly improve plasticization efficiency while maintaining balance among tensile strength, elongation rate and migration resistance.

MODE FOR CARRYING OUT THE INVENTION

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

DEFINITION OF TERMS

The term "composition" as used in the present disclosure includes a reaction product and a decomposition product formed from the materials of a corresponding composition as well as a mixture of materials including the corresponding composition.

The term "straight vinyl chloride polymer" as used in the present disclosure may mean one type of vinyl chloride polymers polymerized by suspension polymerization, bulk polymerization, etc., and may refer to a polymer having a porous particle shape in which a large number of pores having a size of tens to hundreds of micrometers are dispersed, no cohesiveness, and excellent flowability.

The term "paste vinyl chloride polymer" as used in the present disclosure may mean one type of vinyl chloride polymers polymerized by microsuspension polymerization, microseed polymerization, emulsion polymerization, etc., and may refer to a polymer having a minute and dense particle shape without pores and with a size of tens to thousands of nanometers, and a polymer having cohesiveness and inferior flowability.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Methods

In the present disclosure, the content analysis of the components in a composition is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 µl, initial value: 70° C./4.2 min, end value: 280° C./7.8 min, program rate: 15° C./min).

In the present disclosure, "hardness" means Shore hardness (Shore "A" and/or Shore "D") at 25° C. and is measured in conditions of 3T 10s using ASTM D2240. The hardness may be an index for evaluating plasticization efficiency, and the lower the value is, the better the plasticization efficiency is.

In the present disclosure, "tensile strength" is obtained according to an ASTM D638 method by drawing a specimen in a cross head speed of 200 mm/min (1T) using a test apparatus of U.T.M (manufacturer: Instron, model name: 4466), measuring a point where the specimen is cut, and calculating according to Mathematical Equation 1 below.

Tensile strength(kgf/cm$^2$)=load value(kgf)/thickness (cm)×width(cm)    [Mathematical Equation 1]

In the present disclosure, "elongation rate" is obtained according to an ASTM D638 method by drawing a specimen in a cross head speed of 200 mm/min (1T) using the U.T.M, measuring a point where the specimen is cut, and calculating according to Mathematical Equation 2 below.

Elongation rate (%)=length after elongation/initial length×100    [Mathematical Equation 2]

In the present disclosure, "migration loss" is obtained according to KSM-3156, by which a specimen with a thickness of 2 mm or more is obtained, glass plates are attached onto both sides of the specimen and a load of 1 kgf/cm$^2$ is applied. The specimen is stood in a hot air circulation type oven (80° C.) for 72 hours, then taken out therefrom and cooled at room temperature for 4 hours. Then, the glass plates attached onto both sides of the specimen are removed, the weights before and after standing the glass plates and a specimen plate in the oven are measured, and the migration loss is calculated according to Mathematical Equation 3 below.

$$\text{Migration loss (\%)} = \{[(\text{weight of initial specimen}) - (\text{weight of specimen after standing in oven})] / (\text{weight of initial specimen})\} \times 100 \quad \text{[Mathematical Equation 3]}$$

In the present disclosure, "volatile loss" is obtained by processing a specimen at 80° C. for 72 hours and then, measuring the weight of the specimen.

$$\text{Volatile loss (\%)} = \{[(\text{weight of initial specimen}) - (\text{weight of specimen after processing})] / (\text{weight of initial specimen})\} \times 100 \quad \text{[Mathematical Equation 4]}$$

In cases of the various measurement conditions, the details of the conditions of the temperature, the speed of revolution, the time, etc., may be somewhat changed according to situations, and if the conditions are different, a measurement method and its conditions will be indicated separately.

Hereinafter, the present invention will be explained in more detail to assist the understanding of the present invention.

According to an embodiment of the present invention, the plasticizer composition is characterized in including one or more dihexyl benzene dicarboxylates, wherein the dihexyl benzene dicarboxylate is one or more selected from dihexyl isophthalate and dihexyl terephthalate, and the hexyl group of the dihexyl benzene dicarboxylate is derived from an isomer mixture of hexyl alcohol.

According to an embodiment of the present invention, the isomer mixture of hexyl alcohol of the plasticizer composition includes two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol and cyclopentyl methanol.

According to the alcohol included in such hexyl alcohol isomers, the alkyl group of the dihexyl benzene dicarboxylate may be determined, and in a final composition, various compositions may be included, wherein two or one isomer alkyl groups of the hexyl alcohol are bonded or not, to two alkyl groups, and the component ratio in the final composition may be determined according to the component ratio of reacting alcohols.

As described above, in the application of a benzene dicarboxylate, if an alcohol having 6 carbon atoms is used, a suitable absorption rate may be secured in contrast to an alcohol having less than 6 carbon atoms, the improvement of processability may be achieved, and tensile strength, elongation rate and volatile loss may be largely improved, and in contrast to an alcohol having greater than 6 carbon atoms, plasticization efficiency may be excellent, and migration resistance and stress resistance may be expected much.

The isomer mixture of hexyl alcohol of the plasticizer composition according to an embodiment of the present invention has the degree of branching of 2.0 or less, preferably, 1.5 or less. Particularly, the degree of branching may be 1.5 or less, 1.3 or less, more preferably, 1.1 or less. In addition, the degree of branching may be 0.1 or more, 0.2 or more, 0.3 or more, most preferably, 0.7 or more. The degree of branching of the isomer mixture of hexyl alcohol may be maintained even after being transformed into dihexyl benzene dicarboxylates through esterification reaction. If the degree of branching is greater than 2.0, balance among physical properties may be broken, and defects falling short of one or more evaluation levels of a product may arise, but within a preferable range of 1.5 or less, the improvement of migration loss and volatile loss as well as mechanical properties may be optimized, and balance among physical properties may be excellent.

Here, the degree of branching may mean that how many branch carbon atoms do the alkyl groups bonded to a material included in the composition have, and may be determined according to the weight ratio of the corresponding material. For example, if 60 wt % of n-hexyl alcohol, 30 wt % of methylpentyl alcohol and 10 wt % of ethylbutyl alcohol are included in an alcohol mixture, the branch carbon numbers of the alcohols are 0, 1 and 2, respectively, and the degree of branching may be calculated by $[(60 \times 0) + (30 \times 1) + (10 \times 2)] / 100$, and may be 0.5. Here, the branch carbon number of cyclopentyl methanol is regarded 0.

The plasticizer composition according to an embodiment of the present invention may include 1-hexanol and 2-methylpentanol in the isomer mixture of hexyl alcohol, and in this case, excellent effects could be obtained in view of migration resistance and volatile loss.

The branch type hexyl alcohol including 2-methylpentanol may be included in 30 parts by weight or more, 40 parts by weight or more, 50 parts by weight or more, preferably, 60 parts by weight or more, 70 parts by weight or more based on 100 parts by weight of the isomer mixture. The amount of the branch type may be the total in the maximum amount, 99 parts by weight or less, 98 parts by weight or less, preferably, 95 parts by weight or less, or 90 parts by weight or less. With the branch type hexyl alcohol in the range, the improvement of mechanical properties may be expected.

In addition, the linear alcohol of 1-hexanol may be included in 50 parts by weight or less, 40 parts by weight or less, preferably, 30 parts by less based on 100 parts by weight of the isomer mixture. The 1-hexanol may not be present in the component but may be included at least 2 parts by weight or more, and in this case, advantages of maintaining the balance among physical properties and improving mechanical properties may be obtained.

The plasticizer composition according to an embodiment of the present invention may include 1-hexanol, 2-methylpentanol and 3-methylpentanol in the isomer mixture of hexyl alcohol, and may further improve volatile loss while maintaining balance among physical properties by further including 3-methylpentanol. In this case, the 3-methylpentanol may be included as the component of the branch type hexyl alcohol to be present to meet the content of the branch type hexyl alcohol.

More preferably, the isomer mixture of hexyl alcohol may further include cyclopentyl methanol, and through this, effects of compensating migration resistance and stress migration may be expected.

In this case, the cyclopentyl methanol may be each independently 20 parts by weight or less, preferably, 15 parts by weight or less, more preferably, 10 parts by weight or less based on 100 parts by weight of the isomer mixture, or may not be present, but the minimum amount for achieving effects thereby may be 2 parts by weight.

In this case, the 3-methylpentanol and cyclopentyl methanol may be each independently 20 parts by weight or less, preferably, 15 parts by weight or less, more preferably, 10 parts by weight or less based on 100 parts by weight of the isomer mixture, or may not be present, but the minimum amount for achieving effects thereby may be 2 parts by weight.

Particularly, due to the features on the ratio degree of the presence of branch type alkyl groups among total alkyl radicals in a final composition, further, on the ratio degree of the presence of a specific branched alkyl radicals among the branch type alkyl groups, plasticization efficiency and the balance of physical properties of migration/loss properties may be controlled, mechanical properties such as tensile strength and elongation rate and stress resistance may be maintained to the same or better levels. In addition, due to the interaction between various types of benzene dicarboxylates included in the composition, prominent carbonization properties may be achieved, and this could be achieved from the components of the aforementioned hexyl alcohol isomers and the component ratio thereof.

Through this, products which may eliminate environmental issues of the conventional phthalate-based products and further improve loss properties may be accomplished, the migration and loss properties of the conventional terephthalate-based products may be markedly improved, and products having significantly improved mechanical properties and migration resistance in contrast to the conventional commercial products may be achieved.

The dihexyl benzene dicarboxylate according to an embodiment of the present invention is characterized in being one or more selected from dihexyl isophthalate and dihexyl terephthalate. If the dihexyl benzene dicarboxylate is the dihexyl phthalates, though these are not materials regulated by environmental issues, environmental problems are potentially included, and there are many restrictions on use, and the phthalate shows very inferior mechanical properties such as tensile strength and elongation rate, and also shows a very low level of plasticization efficiency in contrast to the isophthalate or terephthalate, and the case of using the dihexyl phthalate is unsuitable.

In addition, the isophthalate and terephthalate are widely used as replacements of a phthalate-based plasticizer, but most of the alkyl groups applied is a 2-ethylhexyl group of C8, and it is general that a composition obtained by mixing the C8 isophthalate or terephthalate with a secondary plasticizer is applied as a plasticizer, or a three-component-based composition obtained by controlling a molecular weight through the transesterification reaction of the material with an alcohol having a small carbon number, for example, C3 to C5 alcohol, is applied as a plasticizer. On the use of an isomer, there is no situation of applying a material other than C5 terephthalate and C9 terephthalate.

However, in the present invention, the balance among physical properties may be maintained optimally without showing any one extremely inferior feature among the physical properties by using a hexyl alcohol having 6 carbon atoms, and by using the hexyl alcohol in a mixture state by mixing the isomers thereof, not using the hexyl alcohol alone, effects of maximally improving plasticization efficiency may be provided.

Particularly, the dihexyl benzene dicarboxylate may be dihexyl isophthalate, dihexyl terephthalate, or a mixture of the isophthalate and terephthalate. The selection of such isophthalate and terephthalate may be suitably conducted and applied according to desired uses, and if the mixture of the two components is used, there are advantages in balancing physical properties even easier.

A method of preparing the plasticizer composition according to an embodiment of the present invention is a method well-known in the art, and any methods that may prepare the aforementioned plasticizer composition may be applied without specific limitation.

For example, the composition may be prepared by direct esterification reaction of benzene dicarboxylic acid (isophthalic acid and/or terephthalic acid) or the anhydride thereof, with the isomer mixture of hexyl alcohol, or the composition may be prepared by transesterification reaction of dihexyl benzene dicarboxylate and the isomer mixture of hexyl alcohol.

The plasticizer composition according to an embodiment of the present invention is a material prepared by performing the esterification reaction suitably, and the preparation method is not specifically limited as long as the above-described conditions are satisfied, particularly, the ratio of a branch type alcohol in the isomer mixture alcohol is controlled, and a specific component is included.

For example, the direct esterification may be performed through a step of injecting benzene dicarboxylic acid or the derivatives thereof, and a mixture alcohol of two or more types, adding a catalyst and reacting under a nitrogen atmosphere; a step of removing unreacted raw materials; a step of neutralizing (or deactivating) unreacted raw materials and the catalyst; and a step of removing (for example, distillation under a reduced pressure) impurities and filtering.

The components of the isomer mixture of hexyl alcohol and the weight ratio of the components are the same as described above. The isomer mixture of the alcohol may be used in a range of 200 to 900 mol %, 200 to 700 mol %, 200 to 600 mol %, 250 to 500 mol %, or 270 to 400 mol % based on 100 mol % of an acid, and by controlling the amount of the alcohol, the component ratio in a final composition may be controlled.

The catalyst may be, for example, one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as a heteropoly acid, natural/synthetic zeolites, cation and anion exchange resins, and an organometal such as tetraalkyl titanate and polymers thereof. In a particular embodiment, the catalyst may use tetraalkyl titanate. Preferably, as an acid catalyst having a low activation temperature, paratoluenesulfonic acid and methanesulfonic acid may be suitable.

The amount used of the catalyst may be different according to the types thereof, and for example, a homogeneous catalyst may be used in an amount of 0.01 to 5 wt %, 0.01 to 3 wt %, 1 to 5 wt % or 2 to 4 wt % based on total 100 wt % of reactants, and a heterogeneous catalyst may be used in an amount of 5 to 200 wt %, 5 to 100 wt %, 20 to 200 wt %, or 20 to 150 wt % based on the total amount of the reactants.

In this case, the reaction temperature may be within a range of 100° C. to 280° C., 100° C. to 250° C., or 120° C. to 230° C.

In another embodiment, the transesterification reaction may be reaction of isophthalate or terephthalate with an alcohol having an alkyl radical different from the alkyl radicals of the two benzene dicarboxylates. Here, the alkyl groups of the benzene dicarboxylate and the alcohol may be exchanged.

The "transesterification reaction" used in the present invention means the reaction of an alcohol and an ester to exchange the alkyl of the ester and the alkyl of the alcohol, as shown in Reaction 1 below.

[Reaction 1]

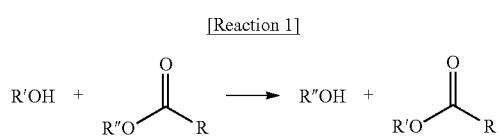

The composition ratio of the mixture prepared through the transesterification reaction may be controlled according to the amount added of the alcohol. The amount added of the alcohol may be 0.1 to 200 parts by weight, particularly, 1 to 150 parts by weight, more particularly, 5 to 100 parts by weight based on 100 parts by weight of the dihexyl benzene dicarboxylate. For reference, the factor determining the component ratios in a final composition may be the amount added of the alcohol as in the direct esterification.

According to an embodiment of the present invention, the transesterification reaction may be performed at a reaction temperature of 120° C. to 190° C., preferably, 135° C. to 180° C., more preferably, 141° C. to 179° C. for 10 minutes to 10 hours, preferably, 30 minutes to 8 hours, more preferably, 1 to 6 hours. Within the temperature and time ranges, the component ratio of a final plasticizer composition may be efficiently controlled. In this case, the reaction time may be calculated from a point where the reaction temperature is achieved after elevating the temperature of the reactants.

The transesterification reaction may be performed under an acid catalyst or a metal catalyst, and in this case, effects of decreasing the reaction time may be achieved.

The acid catalyst may include, for example, sulfuric acid, methanesulfonic acid or p-toluenesulfonic acid, and the metal catalyst may include, for example, an organometal catalyst, a metal oxide catalyst, a metal salt catalyst, or a metal itself.

The metal component may be, for example, any one selected from the group consisting of tin, titanium and zirconium, or a mixture of two or more thereof.

According to another embodiment of the present invention, a resin composition including the aforementioned plasticizer composition and a resin is provided.

The resin may use common resins well-known in the art. For example, a mixture of one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, polylactic acid, natural rubber, synthetic rubber and thermoplastic elastomer may be used, without limitation.

The plasticizer composition may be included in 5 to 150 parts by weight, preferably, 5 to 130 parts by weight, or 10 to 120 parts by weight based on 100 parts by weight of the resin.

Generally, the resin using the plasticizer composition may be prepared into a resin product through a melt processing or a plastisol processing, and a resin by the melt processing and a resin by the plastisol processing may be produced differently according to each polymerization method.

For example, in case of using a vinyl chloride polymer in a melt processing, solid phase resin particles having a large average particle diameter are prepared by suspension polymerization, or the like and used, and the vinyl chloride polymer is referred to as a straight vinyl chloride polymer. In case of using a vinyl chloride polymer in a plastisol processing, a sol state resin as minute resin particles is prepared by emulsion polymerization, or the like and used, and this vinyl chloride polymer is referred to as a paste vinyl chloride resin.

In this case, in case of the straight vinyl chloride polymer, a plasticizer may preferably be included in a range of 5 to 80 parts by weight based on 100 parts by weight of the polymer, and in case of the paste vinyl chloride polymer, the plasticizer may be included in a range of 40 to 120 parts by weight based on 100 parts by weight of the polymer.

The resin composition may further include a filler. The filler may be 0 to 300 parts by weight, preferably, 50 to 200 parts by weight, more preferably, 100 to 200 parts by weight based on 100 parts by weight of the resin.

The filler may use fillers well-known in the art and is not specifically limited. For example, the filler may be a mixture of one or more types selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer as necessary. Each of the other additives such as the stabilizer may be, for example, 0 to 20 parts by weight, preferably, 1 to 15 parts by weight based on 100 parts by weight of the resin.

The stabilizer may use, for example a calcium-zinc-based (Ca—Zn-based) stabilizer such as a composite stearate of calcium-zinc or barium-zinc (Ba—Zn-based) stabilizer, but is not specifically limited thereto.

The resin composition may be applied to both a melt processing and a plastisol processing as described above, and a calendaring processing, an extrusion processing, or an injection processing may be applied to the melt processing, and a coating processing, or the like may be applied to the plastisol processing.

EXAMPLES

Hereinafter, embodiments will be explained in detail to particularly explain the present invention. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1-1

To a four-neck, 3 liter reactor equipped with a cooler, a condenser, a decanter, a reflux pump, a temperature controller and a stirrer, 516.5 g of isophthalic acid, 1,170 g of hexanol (mixed hexanol of n-hexanol and 2-methylpentanol in a weight ratio of 1:9) and 1.55 g of tetraisopropyl titanate as a catalyst were injected, the reaction temperature was set to 230° C., and direct esterification reaction was performed for about 6 hours while continuously injecting a nitrogen gas. The reaction was finished at a point where an acid value reached 0.1.

After finishing the reaction, extractive distillation was performed under a reduced pressure to remove unreacted raw materials. After the extractive distillation, a neutralization process, a dehydration process and a filtering process were performed to obtain a composition including di (n-hexyl) isophthalate (DnHIP), (n-hexyl) (2-methylpentyl) isophthalate (nH2MPIP) and di (2-methylpentyl) isophthalate (D2MPIP).

Example 1-2

A composition including di (n-hexyl) isophthalate (DnHIP), (n-hexyl) (2-methylpentyl) isophthalate (nH2MPIP) and di (2-methylpentyl) isophthalate (D2MPIP) was obtained by performing the same method as in Example 1-1 except for using a mixed mixture of n-hexanol and 2-methylpentanol in a weight ratio of 3:7 as the hexanol.

Example 1-3

A composition including di (n-hexyl) isophthalate (DnHIP), (n-hexyl) (2-methylpentyl) isophthalate (nH2MPIP) and di (2-methylpentyl) isophthalate (D2MPIP) was obtained by performing the same method as in Example 1-1 except for using a mixed mixture of n-hexanol and 2-methylpentanol in a weight ratio of 5:5 as the hexanol.

Example 1-4

A composition including di (n-hexyl) isophthalate (DnHIP), (n-hexyl) (2-methylpentyl) isophthalate (nH2MPIP) and di (2-methylpentyl) isophthalate (D2MPIP) was obtained by performing the same method as in Example 1-1 except for using a mixed mixture of n-hexanol and 2-methylpentanol in a weight ratio of 7:3 as the Example 1-5

A composition including di (n-hexyl) isophthalate (DnHIP), (n-hexyl) (2-methylpentyl) isophthalate (nH2MPIP) and di (2-methylpentyl) isophthalate (D2MPIP) was obtained by performing the same method as in Example 1-1 except for using a mixed mixture of n-hexanol and 2-methylpentanol in a weight ratio of 9:1 as the hexanol.

Example 1-6

A plasticizer composition was obtained by performing the same method as in Example 1-1 except for using a mixed mixture of n-hexanol, 2-methylpentanol and 3-methylpentanol in a weight ratio of 2:3:5 as the hexanol.

Example 1-7

A plasticizer composition was obtained by performing the same method as in Example 1-1 except for using a mixed mixture of n-hexanol, 2-methylpentanol, 3-methylpentanol and cyclopentyl methanol in a weight ratio of 7:37:44:12 as the hexanol.

If the total weights of the isomer mixtures of hexyl alcohol used in Examples 1-1 to 1-7 were set to 100 parts by weight, the relative parts by weight of each alcohol included in the mixtures are summarized in Table 1 below.

TABLE 1

|  | n-hexanol | 2-methylpentanol | 3-methylpentanol | Cyclopentyl methanol |
|---|---|---|---|---|
| Example 1-1 | 10 | 90 | — | — |
| Example 1-2 | 30 | 70 | — | — |
| Example 1-3 | 50 | 50 | — | — |
| Example 1-4 | 70 | 30 | — | — |
| Example 1-5 | 90 | 10 | — | — |
| Example 1-6 | 20 | 30 | 50 | — |
| Example 1-7 | 7 | 37 | 44 | 12 |

Example 2-1

To a four-neck, 3 liter reactor equipped with a cooler, a condenser, a decanter, a reflux pump, a temperature controller and a stirrer, 516.5 g of terephthalic acid, 1,170 g of hexanol (mixed hexanol of n-hexanol and 2-methylpentanol in a weight ratio of 1:9) and 1.55 g of tetraisopropyl titanate as a catalyst were injected, the reaction temperature was set to 230° C., and direct esterification reaction was performed for about 6 hours while continuously injecting a nitrogen gas. The reaction was finished at a point where an acid value reached 0.1.

After finishing the reaction, extractive distillation was performed under a reduced pressure to remove unreacted raw materials. After the extractive distillation, a neutralization process, a dehydration process and a filtering process were performed to obtain a composition including di (n-hexyl) terephthalate (DnHTP), (n-hexyl) (2-methylpentyl) terephthalate (nH2MPTP) and di (2-methylpentyl) terephthalate (D2MPTP).

Example 2-2

A composition including di (n-hexyl) terephthalate (DnHTP), (n-hexyl) (2-methylpentyl) terephthalate (nH2MPTP) and di (2-methylpentyl) terephthalate (D2MPTP) was obtained by performing the same method as in Example 2-1 except for using a mixed mixture of n-hexanol and 2-methylpentanol in a weight ratio of 3:7 as the hexanol.

Example 2-3

A composition including di (n-hexyl) terephthalate (DnHTP), (n-hexyl) (2-methylpentyl) terephthalate (nH2MPTP) and di (2-methylpentyl) terephthalate (D2MPTP) was obtained by performing the same method as in Example 2-1 except for using a mixed mixture of n-hexanol and 2-methylpentanol in a weight ratio of 7:3 as the hexanol.

Example 2-4

A composition including di (n-hexyl) terephthalate (DnHTP), (n-hexyl) (2-methylpentyl) terephthalate (nH2MPTP) and di (2-methylpentyl) terephthalate (D2MPTP) was obtained by performing the same method as in Example 2-1 except for using a mixed mixture of n-hexanol and 2-methylpentanol in a weight ratio of 9:1 as the hexanol.

Example 2-5

A plasticizer composition was obtained by performing the same method as in Example 2-1 except for using a mixed mixture of n-hexanol, 2-methylpentanol and 3-methylpentanol in a weight ratio of 2:3:5 as the hexanol.

Example 2-6

A plasticizer composition was obtained by performing the same method as in Example 2-1 except for using a mixed mixture of n-hexanol, 2-methylpentanol, 3-methylpentanol and cyclopentyl methanol in a weight ratio of 7:37:44:12 as the hexanol.

If the total weights of the isomer mixtures of hexyl alcohol used in Examples 2-1 to 2-6 were set to 100 parts by weight, the relative parts by weight of each alcohol included in the mixtures are summarized in Table 2 below.

TABLE 2

|  | n-hexanol | 2-methylpentanol | 3-methylpentanol | Cyclopentyl methanol |
|---|---|---|---|---|
| Example 2-1 | 10 | 90 | — | — |
| Example 2-2 | 30 | 70 | — | — |
| Example 2-3 | 70 | 30 | — | — |
| Example 2-4 | 90 | 10 | — | — |
| Example 2-5 | 20 | 30 | 50 | — |
| Example 2-6 | 7 | 37 | 44 | 12 |

Comparative Example 1

Dioctyl phthalate (DOP), a product of LG Chem, was used as a plasticizer composition.

Comparative Example 2

Diisononyl phthalate (DINP), a product of LG Chem, was used as a plasticizer composition.

Comparative Example 3

Di(2-ethylhexyl) terephthalate (DEHTP, LGflex GL300), a product of LG Chem, was used as a plasticizer composition.

Comparative Example 4

A mixture (LGflex GL500) of di (2-ethylhexyl) terephthalate (DEHTP), butyl (2-ethyl hexyl) terephthalate (BEHTP) and dibutyl terephthalate (DBTP), products of LG Chem, was used as a plasticizer composition.

Comparative Example 5

A plasticizer composition was obtained by the same method as in Example 1-1 except for using a single compound of 2-methylpentanol instead of the mixture as the hexanol.

Comparative Example 6

A plasticizer composition was obtained by the same method as in Example 2-1 except for using a single compound of 2-methylpentanol instead of the mixture as the hexanol.

Comparative Example 7

A plasticizer composition was obtained by the same method as in Example 1-1 except for using n-heptanol instead of the hexanol.

Comparative Example 8

A composition including di (n-hexyl) phthalate (DnHPh), (n-hexyl) (2-methylpentyl) phthalate (nH2MPPh) and di (2-methylpentyl) phthalate (D2MPPh) was obtained by performing the same method as in Example 1-3 except for using phthalic acid instead of isophthalic acid.

Experimental Example 1: Evaluation of Sheet Performance

By using the plasticizers of the Examples the Comparative Examples, specimens were manufactured according to ASTM D638 and the prescription and manufacturing conditions below.

(1) Prescription: 100 parts by weight of a straight vinyl chloride polymer (LS100), 50 parts by weight of a plasticizer and 3 parts by weight of a stabilizer (BZ-153T)
(2) Mixing: mixing at 98° C. in 700 rpm
(3) Manufacture of specimen: 1T, 2T and 3T sheets were manufactured by processing at 160° C. for 4 minutes by a roll mill, and at 180° C. for 2.5 minutes (low pressure) and 2 minutes (high pressure) by a press
(4) Test items
1) Hardness: Shore hardness (Shore "A" and "D") at 25° C. was measured using a 3T specimen for 10 seconds using ASTM D2240. The plasticization efficiency was assessed excellent if the value was small.
2) Tensile strength: By an ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows.

Tensile strength(kgf/cm$^2$)=load value(kgf)/thickness (cm)×width(cm)

3) Elongation rate measurement: By an ASTM D638 method, a specimen was drawn in a cross-head speed of 200 mm/min using a test apparatus of U.T.M, and a point where the 1T specimen was cut was measured. The elongation rate was calculated as follows.

Elongation rate (%)=length after elongation/initial length×100

4) Migration loss measurement: According to KSM-3156, a specimen with a thickness of 2 mm or more was obtained, glass plates were attached onto both sides of the 1T specimen, and a load of 1 kgf/cm$^2$ was applied. The specimen was stood in a hot air circulation type oven (80° C.) for 72 hours and then taken out and cooled at room temperature for 4 hours. Then, the glass plates attached onto both sides thereof were removed, the weights of the specimen before and after standing the glass plates and a specimen plate in the oven, were measured, and the migration loss was calculated as follows.

Migration loss (%)={[(initial weight of specimen at room temperature)−(weight of specimen after standing in oven)]/(initial weight of specimen at room temperature)}×100

5) Stress migration measurement: A specimen with a thickness of 2 mm in a bent state was stood at 23° C. for 168 hours, and the degree of migration (degree of oozing) was observed. The results were recorded as numerical values, and excellent properties were shown if the quantity was closer to 0.
6) Carbonization properties evaluation: A specimen with a thickness of 0.25 mm was manufactured into a size of 40 cm×40 cm, carbonization test was performed in a Mathis oven at 230° C. in a rate of 5 mm/10 sec, and an initiation time of black carbonization was relatively compared and evaluated. The excellence of carbonization properties means that the carbonization was initiated relatively lately, and the poverty of carbonization properties means that the carbonization was initiated relatively quickly. Among the numerical values of 1 to 5, 1 means the worst, and 5 means the best.
(5) Evaluation Results
The evaluation results on the test items are shown in Table 3 below.

TABLE 3

| Division | | Plasticization efficiency | | Tensile strength (kgf/cm$^2$) | Elongation rate (%) | Migration loss (%) | Stress migration | Carbonization properties |
|---|---|---|---|---|---|---|---|---|
| | | Hardness (Shore A) | Hardness (Shore D) | | | | | |
| IP series | Example 1-1 | 82.3 | 36.8 | 211.8 | 326.5 | 2.84 | 0.5 | 4 |
| | Example 1-2 | 82.1 | 36.7 | 212.5 | 325.4 | 2.75 | 0.5 | 4 |
| | Example 1-3 | 82.0 | 36.4 | 212.3 | 325.0 | 2.65 | 0 | 4 |
| | Example 1-4 | 81.8 | 36.5 | 210.4 | 320.6 | 2.57 | 0 | 4 |
| | Example 1-5 | 81.7 | 36.3 | 211.9 | 318.2 | 2.43 | 0 | 4 |
| | Example 1-6 | 81.9 | 36.2 | 214.0 | 320.7 | 3.08 | 0 | 4 |
| | Example 1-7 | 82.0 | 36.0 | 211.4 | 318.9 | 2.79 | 0 | 4 |
| TP series | Example 2-1 | 82.8 | 37.3 | 205.3 | 318.7 | 3.04 | 0.5 | 4 |
| | Example 2-2 | 82.3 | 36.9 | 210.5 | 317.6 | 2.98 | 0.5 | 4 |
| | Example 2-3 | 81.9 | 36.4 | 208.7 | 317.6 | 2.87 | 0.5 | 4 |
| | Example 2-4 | 81.9 | 36.6 | 210.6 | 315.8 | 2.66 | 0.5 | 4 |
| | Example 2-5 | 82.1 | 36.4 | 213.2 | 317.9 | 3.10 | 0.5 | 4 |
| | Example 2-6 | 82.2 | 36.4 | 214.8 | 320.8 | 2.94 | 0.5 | 4 |
| | Comparative Example 1 | 84.2 | 38.0 | 199.2 | 313.3 | 1.52 | 0.5 | 2 |
| | Comparative Example 2 | 86.8 | 40.0 | 215.0 | 317.6 | 2.22 | 1 | 3 |
| | Comparative Example 3 | 88.3 | 41.7 | 229.2 | 343.1 | 6.16 | 3 | 5 |
| | Comparative Example 4 | 85.1 | 39.1 | 217.5 | 322.4 | 4.76 | 2 | 5 |
| | Comparative Example 5 | 82.5 | 36.9 | 207.4 | 305.6 | 4.46 | 1 | 4 |
| | Comparative Example 6 | 82.8 | 37.2 | 205.4 | 302.4 | 5.68 | 1.5 | 4 |
| | Comparative Example 7 | 84.0 | 37.8 | 201.2 | 289.8 | 6.41 | 2 | 4 |
| | Comparative Example 8 | 82.0 | 36.5 | 201.8 | 290.7 | 3.24 | 1 | 2 |

Referring to the results of Table 3, it could be confirmed that the plasticizer composition of the present invention maintained the same levels in view of tensile strength and elongation rate when compared to the conventional plasticizers, and improved effects in view of plasticization efficiency and migration resistance. Further, in respect of stress migration and carbonization properties, it could be confirmed that excellent effects were achieved in a balanced way without poverty of any one aspect. Comparative Example 1 or Comparative Example 2 was the most commonly used plasticizer product in the past, but in the present, is unserviceable plasticizer due to environmental regulations. However, the plasticizers according to embodiments of the present invention showed rather excellent plasticization efficiency and mechanical properties when compared to the plasticizers of Comparative Examples 1 and 2, and improved effects in view of carbonization properties. From this, it could be found that the plasticizer of the present invention may replace the conventional plasticizer products which were not eco-friendly, and may rather provide even better effects. In addition, Comparative Examples 3 and 4 are eco-friendly plasticizers which may replace Comparative Examples 1 and 2, but similar to Comparative Examples 1 and 2, Comparative Examples 3 and 4 also showed inferior plasticization efficiency and markedly inferior results in view of migration loss and stress migration, though some excellent effects were shown in view of mechanical properties in contrast to the plasticizers according to embodiments of the present invention. The migration loss and stress migration are indexes which may show stability when applied to a plasticizer product, and the results mean that the plasticizer compositions of embodiments of the present invention may achieve the performance more stably. Though some mechanical properties of Comparative Examples 3 and 4 were excellent, plasticization efficiency or migration resistance were inferior, and if applied to a practical product, it is anticipated that sufficient exhibition of excellent mechanical properties may be difficult.

Meanwhile, in Comparative Examples 5 and 6, not an isomer mixture of hexyl alcohol but a single branch type hexyl alcohol was applied as the alcohol, in applying isophthalic acid or terephthalic acid, and it could be confirmed that inferior results of mechanical properties such as tensile strength and elongation rate were shown in contrast to the Examples, and inferior results were shown in view of migration loss and stress migration in contrast to the Examples. That is, this means that the excellent mechanical properties and migration resistance, achieved in the present invention occurred, because the balance among various alkyl groups derived from the isomer mixture of hexyl alcohol was suitable, and does not mean that the excellent physical properties of the plasticizer compositions could be achieved simply by applying an alcohol of 6 carbon atoms.

In addition, in Comparative Example 7, an alcohol of not 6 carbon atoms but 7 carbon atoms was applied to isophthalic acid, and inferior plasticization efficiency, mechanical properties and migration resistance were shown in contrast to the Examples. That is, this means that the physical properties to the level of the plasticizer compositions of the embodiments of the present invention could not be achieved if the carbon number of the alkyl group bonded to the benzene dicarboxylate is greater than 6, and the excellent effects shown in the plasticizer compositions of embodiments of the present invention could be achieved only in the case where the alkyl group bonded to the benzene dicarboxylate has a carbon number of 6.

Finally, Comparative Example 8 is a case where not isophthalic acid or terephthalic acid but phthalic acid was applied as an acid, and in view of plasticization efficiency, similar levels were shown as the plasticizer compositions of embodiments of the present invention, but in view of mechanical properties, migration resistance and carbonization properties, inferior effects were shown in contrast to the Examples. Since the plasticizer composition of Comparative Example 8 includes a component derived from phthalic acid, defects of not eco-friendly are still remain as Comparative Examples 1 and 2.

The invention claimed is:

1. A plasticizer composition comprising one or more dihexyl benzene dicarboxylates, wherein
    the one or more dihexyl benzene dicarboxylates include one or more selected from dihexyl isophthalate and dihexyl terephthalate,
    a hexyl group of the one or more dihexyl benzene dicarboxylates is derived from an isomer mixture of hexyl alcohol, and
    the isomer mixture of hexyl alcohol comprises two or more selected from the group consisting of 1-hexanol, 1-methylpentanol, 2-methylpentanol, 3-methylpentanol, 4-methylpentanol, 1,1-dimethylbutanol, 1,2-dimethylbutanol, 1,3-dimethylbutanol, 2,2-dimethylbutanol, 2,3-dimethylbutanol, 3,3-dimethylbutanol, 1-ethylbutanol, 2-ethylbutanol, 3-ethylbutanol, and cyclopentyl methanol.

2. The plasticizer composition according to claim 1, wherein the isomer mixture of hexyl alcohol comprises 1-hexanol and 2-methylpentanol.

3. The plasticizer composition according to claim 1, wherein the isomer mixture of hexyl alcohol comprises 30 parts by weight or more of a branched alcohol based on 100 parts by weight of the isomer mixture.

4. The plasticizer composition according to claim 1, wherein the isomer mixture of hexyl alcohol comprises 40 to 95 parts by weight of a branched alcohol based on 100 parts by weight of the isomer mixture.

5. The plasticizer composition according to claim 1, wherein the isomer mixture of hexyl alcohol comprises 40 parts by weight or less of 1-hexanol based on 100 parts by weight of the isomer mixture.

6. The plasticizer composition according to claim 1, wherein the one or more dihexyl benzene dicarboxylates include dihexyl isophthalate.

7. The plasticizer composition according to claim 1, wherein the one or more dihexyl benzene dicarboxylates include dihexyl terephthalate.

8. The plasticizer composition according to claim 1, wherein the one or more dihexyl benzene dicarboxylates include a mixture including dihexyl isophthalate and dihexyl terephthalate.

9. The plasticizer composition according to claim 1, wherein the isomer mixture of hexyl alcohol comprises 1-hexanol, 2-methylpentanol and 3-methylpentanol.

10. A resin composition comprising:
    100 parts by weight of a resin, wherein the resin includes vinyl chloride polymer; and
    5 to 150 parts by weight of the plasticizer composition of claim 1.

11. The resin composition according to claim 10, wherein the vinyl chloride polymer includes a straight vinyl chloride polymer, a paste vinyl chloride polymer, or both.

* * * * *